United States Patent [19]

Van der Pas-Toornstra

[11] 4,397,660
[45] Aug. 9, 1983

[54] PROCESS FOR THE REMOVAL OF $H_2S$ AND $CO_2$ FROM A GAS MIXTURE

[75] Inventor: Hilde M. Van der Pas-Toornstra, The Hague, Netherlands

[73] Assignee: Shell Oil Company, Houston, Tex.

[21] Appl. No.: 367,489

[22] Filed: Apr. 12, 1982

[30] Foreign Application Priority Data

Jun. 15, 1981 [GB] United Kingdom ............... 8118300

[51] Int. Cl.³ ............................................ B01D 53/14
[52] U.S. Cl. ........................................ 55/48; 55/51; 55/73; 423/228
[58] Field of Search ............... 55/43, 48, 51, 73, 89; 423/226, 228, 229, 243

[56] References Cited

U.S. PATENT DOCUMENTS

| 2,237,386 | 4/1941 | Carney | 55/48 X |
|---|---|---|---|
| 2,814,359 | 11/1957 | Koble | 55/48 X |
| 3,039,251 | 6/1962 | Kamlet | 423/226 X |
| 3,208,199 | 9/1965 | Pruiss | 55/48 |
| 3,236,029 | 2/1966 | Afdahl et al. | 55/48 X |
| 3,347,621 | 10/1967 | Papadopoulos et al. | 423/226 |
| 3,475,329 | 10/1969 | Little et al. | 55/73 X |
| 3,502,428 | 3/1970 | Gelbein et al. | 55/73 X |
| 3,656,887 | 4/1972 | Suzuki et al. | 423/226 |
| 3,664,091 | 5/1972 | Hegwer | 55/48 X |
| 3,719,749 | 3/1973 | Smith et al. | 423/228 X |
| 3,965,244 | 6/1976 | Sykes, Jr. | 423/226 X |
| 3,989,811 | 11/1976 | Hill | 423/226 X |
| 4,025,322 | 5/1977 | Fisch | 423/228 X |
| 4,050,909 | 9/1977 | Ranke | 55/73 X |
| 4,184,855 | 1/1980 | Butwell et al. | 55/73 X |
| 4,336,233 | 6/1982 | Appl et al. | 423/228 |

FOREIGN PATENT DOCUMENTS 2072525 10/1981 United Kingdom ............... 423/228

Primary Examiner—Robert H. Spitzer

[57] ABSTRACT

The present invention deals with a process for removal of $H_2S$ and $CO_2$ from a gas mixture in which:
(a) the gas mixture is contacted at elevated pressure countercurrently with lean solvent which comprises a tertiary amine and a physical absorbent;
(b) the loaded solvent obtained is flashed;
(c) the flash gas set free in step (b) is contacted countercurrently with lean solvent under conditions which are selective for $H_2S$ removal;
(d) part of the loaded solvent obtained after flashing is stripped with the gas obtained in step (c);
(e) the stripped solvent obtained in step (d) is introduced as semilean solvent in step (a);
(f) the gas obtained in step (d) is contacted countercurrently with lean solvent under conditions which are selective for $H_2S$ removal; and
(g) loaded solvent obtained in steps (c), (b) and (f) is regenerated to yield lean solvent, wherein a gas with an $H_2S$ concentration suitable to be used in a Claus process is obtained.

12 Claims, 1 Drawing Figure

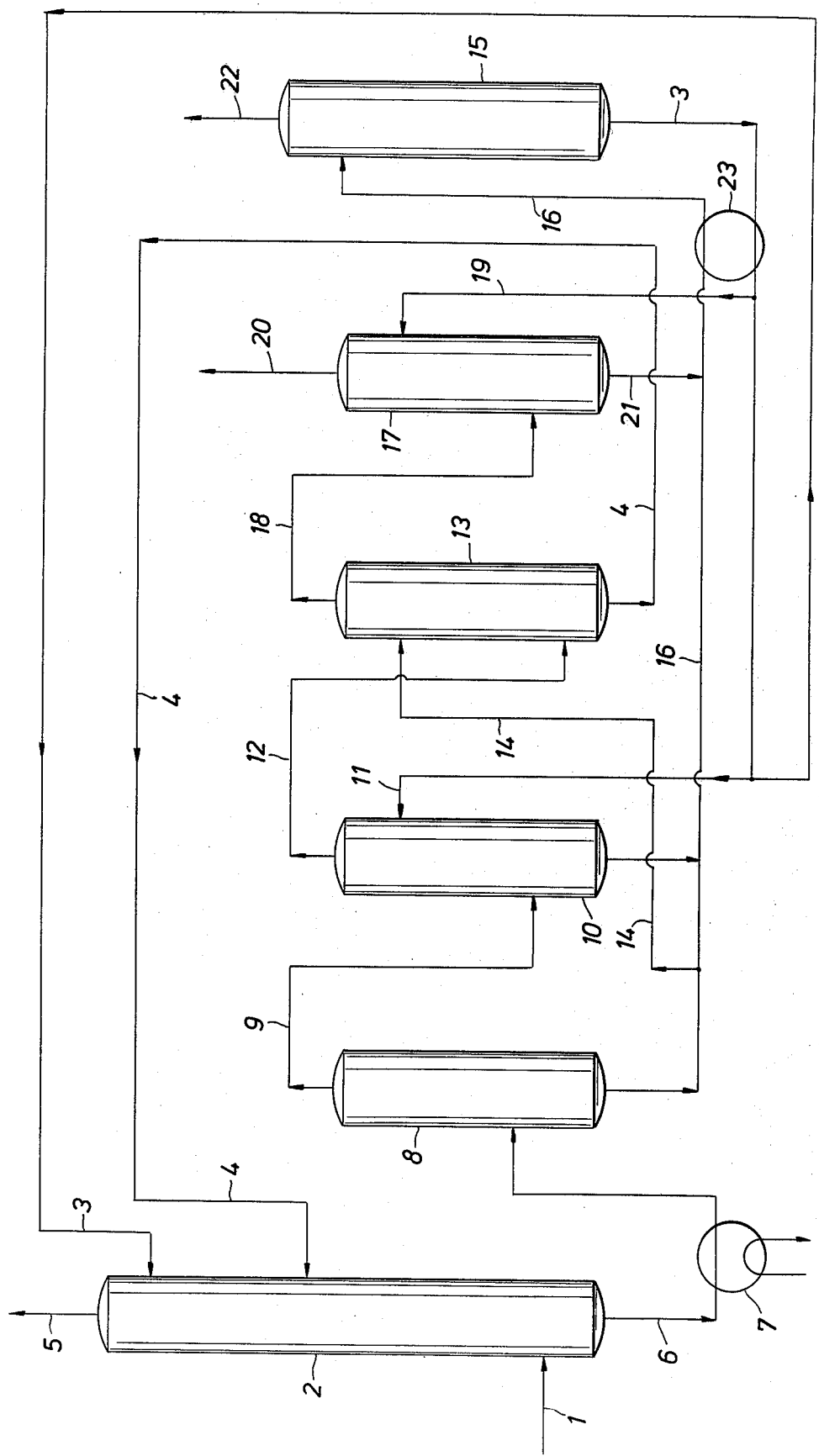

PROCESS FOR THE REMOVAL OF H₂S AND CO₂ FROM A GAS MIXTURE

BACKGROUND OF THE INVENTION

1. Field of the Invention

The invention relates to a process for removal of $H_2S$ and $CO_2$ from a gas mixture and preparation of a gas with a $H_2S$ concentration suitable to be used in a Claus process.

2. Description of the Prior Art

In many cases it is necessary to remove $H_2S$ and, if present, other sulfur-containing impurities such as COS from gas mixtures, for example to render these gas mixtures suitable for catalytic conversions using sulfur-sensitive catalysts, or in order to reduce environmental pollution if before or after combustion these gas mixtures are discharged to the atmosphere.

Examples of gas mixtures from which $H_2S$ and/or other sulfur-containing compounds generally have to be removed are gases obtained by partial combustion, or complete or partial gasification of oil and coal, refinery gases, town gas, natural gas, coke-oven gas, water gas, propane and propylene.

In many cases the $H_2S$ will be removed from the gas mixtures using liquid solvents, which will often have a basic character. In a large number of cases the gas mixtures from which $H_2S$ is to be removed will also contain $CO_2$, at least some of which will be absorbed in the liquid solvent together with $H_2S$. The $H_2S$ and $CO_2$ will be removed from the said gas mixtures at the pressure of the gas mixture concerned, i.e., in many cases at elevated pressure.

Although in most cases $H_2S$ is to be removed nearly completely from the gas mixtures for the reasons given above, in many instances part or all of the $CO_2$ may remain in the gas mixtures after the removal of the $H_2S$ therefrom, because $CO_2$ up till a certain extent does not hamper further use of the purified gas mixture. For that reason it would be attractive to have a process in which the ratio of $H_2S$ to $CO_2$ removed from the gas mixture can be controlled at will, or in other words, in which the selectivity of the removal of $H_2S$ over $CO_2$ can be regulated at will.

In many $H_2S$ removal processes known hitherto the removal of COS often gives rise to problems, because the COS is not absorbed to a great extent in the solvent. A method is also needed to overcome this problem.

The $H_2S$- and $CO_2$-containing gas obtained after regeneration of the solvent used for the removal of these so-called acid gases from the gas mixture cannot be discharged to the atmosphere before at least most of the $H_2S$ has been removed therefrom. The $H_2S$ is very suitably removed from this gas by converting it to elemental sulfur, which is separated off. The conversion of $H_2S$ into elemental sulfur is generally carried out by means of a Claus process in which some of the $H_2S$ is oxidized to $SO_2$, and sulfur and water are formed by reaction of $H_2S$ with $SO_2$, with or without the assistance of a suitable catalyst. In order to be able to carry out a Claus process, the molar percentage of $H_2S$ in a mixture with $CO_2$ must be at least about 15. If this percentage is between about 15 and about 40, the Claus process can be carried out by separating one-third part of the gas and combusting the $H_2S$ therein to $SO_2$, and subsequently mixing the resultant $SO_2$-containing gas with the rest of the $H_2S$-containing gas, after which the Claus reaction can be further carried out at elevated temperature and preferably in the presence of a catalyst. In case a Claus process is to be carried out with a gas which contains $CO_2$ and about 40% mol. $H_2S$ or more, the gas can be combusted with a quantity of air which is sufficient to convert one-third of the $H_2S$ into $SO_2$, and subsequent reaction of the $H_2S$ and $SO_2$ to form sulfur and water preferably in the presence of a suitable catalyst.

Besides the suitability of a process for the removal of $H_2S$ and $CO_2$ (and if desired COS) from gas mixtures, a feature of very much technical interest is the amount of energy needed for the process. The major amount of energy needed is used in the regeneration of the loaded solvent, which regeneration is in most cases carried out by stripping with steam. The steam requirement is greatly dependent on the amount of solvent circulating in the process, the lower the solvent circulation the lower the amount of steam needed for regeneration. The extent of loading of the loaded solvent to be regenerated may also be of importance in this respect. A reduction in solvent circulation would also contribute further savings from a capital cost point of view in that smaller absorption and regeneration columns are required, smaller heat-exchange equipment is needed and less solvent for filling the columns is necessary.

SUMMARY OF THE INVENTION

The present invention provides a process in which $H_2S$ and $CO_2$ can be removed from a gas mixture with preparation of a gas suitable to be used in a Claus process in which process the amount of $CO_2$ to be removed from the feed can be regulated, COS can be removed from the feed and the amount of solvent circulating in the process is limited.

Accordingly, the present invention is a process for the removal of $H_2S$ and $CO_2$ from a gaseous feed mixture and preparation of a gas with a $H_2S$ concentration suitable to be used in a Claus process, which process comprises:

(a) countercurrently contacting said gaseous feed mixture at elevated pressure in a first absorption zone with a lean absorbent solution comprising the mixture of a tertiary amine, sulfolane and water, therein producing an unabsorbed portion and a first loaded absorbent solution;

(b) passing said first loaded absorbent solution to a flashing zone maintained at a pressure below the total partial pressure of the $CO_2$ and $H_2S$ present in said first loaded absorbent solution at the temperature present in said flashing zone, therein effecting the liberation of a gaseous stream containing a portion of said $CO_2$ and $H_2S$ present in said first loaded absorbent solution and producing a semi-loaded absorbent solution;

(c) countercurrently contacting said gaseous stream from step (b) with a lean absorbent solution comprising the mixture of a tertiary amine, sulfolane and water in a second absorption zone under conditions which are selective for $H_2S$ removal, therein producing a $CO_2$-rich unabsorbed gaseous stream and a second loaded absorbent solution;

(d) passing a portion of said first loaded absorbent solution to a regeneration zone, therein regenerating said first loaded absorbent and producing a lean absorbent solution;

(e) passing said second loaded absorbent solution to a regeneration zone, therein regenerating said second loaded absorbent and producing a lean absorbent solution;

(f) stripping at least a portion of said semi-loaded absorbent solution from step (b) with said $CO_2$-rich unabsorbed gaseous stream from step (c) in a stripping zone, therein producing a stripped gaseous stream and a stripped absorbent stream;

(g) passing said stripped absorbent stream to said first absorption zone at a point between where said gaseous feed mixture enters said first absorption zone and where said lean absorbent solution enters said first absorption zone;

(h) concurrently contacting said stripped gaseous stream from step (f) with a lean absorbent solution comprising the mixture of a tertiary amine, sulfolane and water in a third absorption zone under conditions which are selective for $H_2S$ removal, therein producing an unabsorbed gaseous stream and a third loaded absorbent solution; and (i) passing said third loaded absorbent solution to a regeneration zone, therein regenerating said third loaded absorbent and producing a lean absorbent solution. The gas obtained from regenerations (d), (e) and (i) yields a gas with a $H_2S$ concentration suitable for use in a Claus process.

DETAILED DESCRIPTION OF THE INVENTION

A lean absorbent solution (solvent) in the context of this specification and claims is a solvent which is substantially free of $H_2S$ and $CO_2$. A loaded absorbent solution (solvent) is a solvent which contains appreciable amounts of $CO_2$ and $H_2S$, and a semi-lean absorbent solution (solvent) is a solvent which contains apppreciable amounts of $CO_2$ but no or a limited amount of $H_2S$.

The solvent comprises a tertiary amine, a physical absorbent and preferably water.

Very suitable tertiary amines are aliphatic amines, in particular those amines which contain at least one hydroxylalkyl group. Examples are triethanolamine, tripropanolamine, tri-isopropanolamine, ethyldiethanolamine, dimethylethanolamine and diethylethanolamine. A preferred amine is methyldiethanolamine. Tertiary amines are important since $H_2S$ and $CO_2$ are able to react with tertiary amines.

A physical absorbent is a compound in which $H_2S$ and $CO_2$ are soluble, but are soluble without undergoing a reaction therewith. Very suitable physical absorbents are sulfolane and substituted sulfolanes, tetra-ethylene glycol dimethylether, alcohols with a 1-5 carbon atoms (e.g., methanol), N-methylpyrrolidone and alkylated carboxylic acid amides (e.g., dimethylformamide). Preference is given to sulfolane.

The amounts of tertiary amine and physical absorbent (and if present water) in the solvent may vary between wide limits. Very suitably the solvent contains 5-35% weight (w) of water, 15-55%w of physical absorbent and 10-60%w of tertiary amine.

The contacting of the gas mixture with the solvent in step (a) is carried out at elevated pressure, which is considered to be a pressure of at least 5, in particular of at least 10 bars. Pressures of 20-100 bars are very suitable.

The contacting of the gas mixture with the solvent in step (a) is very suitably carried out in a zone having from 15-80 contacting layers, such as valve trays, bubble cap tays, baffles and the like. It has surprisingly been found that by using the solvent according to the invention the $H_2S$ can substantially be removed from the gas mixture used as feed while regulating the amount of $CO_2$ which is left in the purified gas. This regulation can be achieved by regulating the solvent circulation, i.e., the ratio of solvent fed to the extracting zone and the amount of gas mixture fed thereto.

The temperature and pressure during the contacting of the gas mixture and the solvent in step (a) may vary between wide limits. Temperatures of from 15°-110° C. are very suitable, temperatures of from 20°-80° C. are preferred.

In step (a) all or the greater part of COS present is removed from the gas mixture.

From step (a) a loaded solvent is obtained. This loaded solvent may contain besides $H_2S$ and $CO_2$ appreciable amounts of dissolved other non-acid components from the gas mixture to be purified, e.g., hydrocarbons, carbon monoxide, hydrogen. It may be of advantage to remove these non-acid components at least partially from the loaded solvent by flashing to a pressure which is higher than the sum of the partial pressures belonging to the $H_2S$ and $CO_2$ present in the loaded solvent. In this way only very small amounts of $H_2S$ and $CO_2$ are released from the solvent together with the non-acid components. If desired, the gas mixture obtained from this flashing may be recirculated to step (a). In step (b) the loaded solvent is flashed to a pressure which is below the sum of the partial pressures of the $CO_2$ and $H_2S$ present in the loaded solvent at the prevailing temperature, i.e., to a pressure of from 5-1 bar. Flashing to about atmospheric pressure is preferred. In the gas set free during the flashing the molar ratio of $CO_2$ to $H_2S$ is higher than the molar ratio of the $CO_2$ and $H_2S$ which remain present in the loaded solvent after the flashing. The flashing in step (b) is very suitably carried out at a somewhat higher temperature than the contacting in step (a), e.g., at a temperature of from 50°-120° C., preferably at a temperature from 60°-90° C. Heating of the loaded solvent before it is flashed is conveniently carried out with low-grade heat or by heat exchange with other process streams, in particular with regenerated lean solvent.

The gas set free during the flashing consists of $CO_2$ and $H_2S$, and the $H_2S$ is removed therefrom in step (c) by contacting the said gas countercurrently with lean solvent. It is of advantage to remove the $H_2S$ selectively from this gas, and this is very suitably achieved by contacting the said gas with lean solvent countercurrently in a tray column with at most 25 trays and at a gas velocity of at least ½ m/sec. The pressure applied in this step will in general be that of the gas set free during the flashing. In order to achieve a good selectivity for $H_2S$ the temperature of the lean solvent is very suitably of from 15°-50° C., although lower or higher temperatures are not excluded. In order to achieve a good selectivity for $H_2S$ the temperature of the lean solvent is very suitably of from 15°-50° C., although lower or higher temperatures are not excluded. In order to reduce the amount of lean solvent required in step (c) it is of advantage to lower the temperature of the gas set free during the flashing in step (b), e.g., by cooling, before contacting it with lean solvent in step (c).

The loaded solvent obtained in step (c) is regenerated in step (e) to yield lean solvent as will be discussed later.

The gas obtained in step (c) is substantially free of $H_2S$ and consists totally or for the greater part of $CO_2$.

The loaded solvent obtained after the flashing in step (b) is split into two parts. The first part is regenerated in step (d) to yield lean solvent as will be discussed later.

The second part of the loaded solvent obtained after the flashing in step (b) is in step (f) stripped with the gas obtained in step (c) which gas consists for the greater part, and in most cases totally, of $CO_2$. In this way the loaded solvent obtained after the flashing is freed at least partly from $H_2S$, but not from $CO_2$, thus yielding semi-lean solvent.

This semi-lean solvent is in step (g) introduced in step (a) at a point nearer to the entrance of the gas mixture than the lean solvent. In doing so regeneration of this semi-lean solvent is avoided, thus leading to an appreciable energy saving, because no steam or other means are to be used for its regeneration. Moreover the $CO_2$ present in this semi-lean solvent reduces the removal of $CO_2$ from the gas mixture, thus increasing the selectivity of the process for $H_2S$ removal, which in many cases may be particularly attractive.

The gas obtained in the stripping in step (f) contains $H_2S$ and $CO_2$. The former is to be removed therefrom before it can be vented to the atmosphere, if desired after combustion. In order to achieve $H_2S$ removal the strip gas is contacted countercurrently with lean solvent in step (h) preferably under conditions in which $H_2S$ is selectively absorbed. These conditions are the same as discussed for step (c). Here again it may be of advantage to cool the gas obtained in step (f) before contacting it with lean solvent in step (h). The loaded solvent thus obtained is regenerated in step (i) to yield lean solvent as will be discussed later. The gas emerging from step (h) consists essentially of $CO_2$ and contains only very small amounts of $H_2S$. In most cases environmental regulations will allow it to be vented to the atmosphere, if desired after combustion of the $H_2S$ to $SO_2$.

It is preferred that the loaded solvents to be regenerated in steps (d), (e), and (i) are combined and regenerated together.

The regeneration is very suitably carried out by heating in a regeneration column (e.g., to a temperature of from 80°-160° C.), which heating is preferably carried out with the aid of steam. The gas obtained during this regeneration contains $H_2S$ in such a concentration that it can suitably be used in a Claus process for the preparation of sulfur.

The lean solvent obtained after the regeneration will be introduced at the appropriate places in the system discussed above. It is very suitable to use the regenerated solvent for heat exchange purposes before introducing it in steps (a), (c) and (h); in particular the regenerated solvent is heat-exchanged with the loaded solvent obtained after the flashing step (b) and/or with the loaded solvent emerging from step (a) before flashing.

The invention is illustrated at the hand of the FIGURE which only shows one embodiment of the invention.

Gas mixture to be purified is fed via line 1 to absorber 2, in which it is contacted with lean solvent introduced via line 3 and semi-lean solvent introduced via line 4. Purified gas leaves absorber 2 via line 5. Loaded solvent leaves the absorber via line 6, if desired heated in heater 7 and forwarded to flash vessel 8 where it is flashed to a pressure below the sum of the partial pressures of the $CO_2$ and $H_2S$ present in the loaded solvent. The gases set free during the flashing are led via line 9 to absorber 10 and contacted with lean solvent supplied via line 11.

The gas emerging from this absorber is forwarded via line 12 to stripper 13 and used as stripping gas for part of the loaded solvent obtained in flash vessel 8 which is introduced in stripper 13 via line 14. The remainder of the loaded solvent obtained in flash vessel 8 and the loaded solvent obtained in absorber 10 are sent to regenerator 15 via line 16, in which line they are heat-exchanged with regenerated solvent from regenerator 15. The semi-lean solvent obtained in stripper 13 is forwarded to absorber 2 via line 4.

The gas emerging from stripper 13 is sent to absorber 17 via line 18 and contacted with lean solvent supplied via line 19. The gas emerging from absorber 17 via line 20 consists of $CO_2$ and no or a very small amount of $H_2S$. The loaded solvent emerging from absorber 17 is forwarded via line 21 to line 16 and sent to regenerator 15. Regeneration is carried out in 15 by stripping with steam. The gas emerging from the regenerator via line 22 is rich in $H_2S$ and is suitable to be used in a Claus process. Regenerated solvent leaves regenerator 15 via line 3, is heat-exchanged in heat exchanger 23 with loaded solvent in line 16, and is fed to absorbers 2, 10 and 17.

The invention is further illustrated by reference to the following illustrative embodiment and comparative example, which are given for the purpose of illustration only and are not meant to limit the invention to the particular reactants and conditions employed therein. Both the illustrative embodiment and the comparative example are based on theoretical calculations.

Illustrative Embodiment I

The numbers refer to the FIGURE.

About 10,000 k.mol/h of a gas mixture (which per 10,000 k.mol contains 171 k.mol $H_2S$, 4431 k.mol $CO_2$, 2775 k.mol CO, 2578 k.mol $H_2$, 37 k.mol $N_2$ and 8 k.mol COS) are introduced at a temperature of 40° C. and a pressure of 44 bar via line 1 into the bottom part of absorber 2 (which contains 30 valve trays), and is countercurrently contacted with lean solvent consisting of methyl-diethanolamine (50%w), sulfolane (25%w) and water (25%w), which is introduced at a temperature of 40° C. via line 3 (155 m$^3$/h) at the top of the absorber, and with semi-lean solvent (which contains 617 k.mol/h $CO_2$ and 75 k.mol/h $H_2S$) which is introduced at a temperature of 40° C. and a pressure of 43.7 bar via line 4 (615 m$^3$/h). Purified gas (8704.8 k.mol/h composed of 3358 k.mol $CO_2$, 2753 k.mol CO, 2556 k.mol $H_2$, 37 k.mol $N_2$, 0.8 k.mol COS and containing less than 200 ppm vol. $H_2S$) leaves absorber 2 via line 5.

Loaded solvent is removed from absorber 2 via line 6 at a temperature of 68° C. and at a pressure of 44 bar in an amount of 770 m$^3$/h. This solvent contains 246 k.mol/h $H_2S$ and 1690 k.mol/h $CO_2$. It is heated in heater 7 with low pressure steam and flashed in flash vessel 8 to a pressure of 1.5 bar and a temperature of 60° C. The gases set free are fed via line 9 to absorber 10, and contacted at 40° C. and 1.4 bar with 200 m$^3$/h lean solvent supplied via line 11. The gases emerging from absorber 10 are forwarded via line 12 to stripper 13, to which stripper 615 m$^3$/h of the loaded solvent obtained in flash vessel 8 (containing 140 k.mol/h $H_2S$ and 617 k.mol/h $CO_2$) are introduced via line 14. The remaining loaded solvent from flash vessel 8 is heat-exchanged in heat exchanger 23 with lean solvent and fed via line 16 to regenerator 15. The semi-lean solvent obtained from stripper 13 is introduced into absorber 2 via line 4 in the amount and at the temperature and pressure mentioned above. The gas emerging from stripper 13 is forwarded via line 18, and introduced into absorber 17, where it is contacted with 252 m³/h lean solvent, introduced via line 19 at a temperature of 30° C. at 1.1 bar. Via line 20 770.5 k.mol/h gas emerges consisting of 0.3 k.mol $H_2S$, 725.5 k.mol $CO_2$, 22 k.mol CO, 22 k.mol $H_2$ and 0.7 k.mol COS. The loaded solvent obtained from absorber 17 (252 m³/h containing 68.9 k.mol/h $H_2S$ and 120 k.mol/h $CO_2$) is combined with the loaded solvents from flash vessel 8 and absorber 10 (together 607 m³/h) and forward via line 16 to regenerator 15, which is heated with steam. The gas which emerges from regenerator 15 via line 22 (530.5 k.mol per hour) consists of 176.5 k.mol $H_2S$, 353.3 k.mol $CO_2$ and 0.7 k.mol COS. Regenerated solvent (607 m³/h) is heat-exchanged in heat exchanger 23 with loaded solvent in line 16 and forwarded via line 3 to absorber 2 (155 m³/h), to absorber 10 via line 11 (200 m³/h) and to absorber 17 via line 19 (252 m³/h).

Comparative Example

The 10,000 k.mol/h of the gas mixture used in the Example are introduced at a temperature of 40° C. into the bottom part of an absorber, which contains 20 valve trays, and is contacted countercurrently with a lean solvent consisting of di-isopropanolamine (45%w), sulfolane (40%w) and water (15%w) (which solvent is not according to the invention). The solvent is introduced at a temperture of 40° C. at the top of the absorber in an amount of 1675 m³/h, in order to yield purified gas containing less than 200 ppm $H_2S$. This purified gas contained 1680 k.mol per hour $CO_2$. Loaded solvent was regenerated by stripping with steam, yielding a gas which consisted of 2751 k.mol/h $CO_2$ and 171 k.mol/h $H_2S$.

The amount of loaded solvent to be regenerated (1675 m³/h) is much higher than that of the Example (607 m³/h), so that more steam is needed for its regeneration. Moreover the mixture of $CO_2$ and $H_2S$ obtained at the regeneration of the loaded solvent is unsuitable to be used in a Claus process because the $H_2S$ content is too low. Further enrichment in $H_2S$ by absorption/regeneration steps with a suitable solvent of this mixture is needed to produce a gas suitable for a Claus process.

What is claimed is:

1. A process for the removal of $H_2S$ and $CO_2$ from a gaseous feed mixture and preparation of a gas with a $H_2S$ concentration suitable to be used in a Claus process, which process comprises:
   (a) countercurrently contacting said gaseous feed mixture at elevated pressure in a first absorption zone with a lean absorbent solution comprising the mixture of a tertiary amine, sulfolane and water, therein producing an unabsorbed portion and a first loaded absorbent solution;
   (b) passing said first loaded absorbent solution to a flashing zone maintained at a pressure below the total partial pressure of the $CO_2$ and $H_2S$ present in said first loaded absorbent solution at the temperature present in said flashing zone, therein effecting the liberation of a gaseous stream containing a portion of said $CO_2$ and $H_2S$ present in said first loaded absorbent solution and producing a semi-loaded absorbent solution;
   (c) countercurrently contacting said gaseous stream from step (b) with a lean absorbent solution comprising the mixture of a tertiary amine, sulfolane and water in a second absorption zone under conditions which are selective for $H_2S$ removal, therein producing a $CO_2$-rich unabsorbed gaseous stream and a second loaded absorbent solution;
   (d) passing a portion of said first loaded absorbent solution to a regeneration zone, therein regenerating said first loaded absorbent and producing a lean absorbent solution;
   (e) passing said second loaded absorbent solution to a regeneration zone, therein regenerating said second loaded absorbent and producing a lean absorbent solution;
   (f) stripping at least a portion of said semi-loaded absorbent solution from step (b) with said $CO_2$-rich unabsorbed gaseous stream from step (c) in a stripping zone, therein producing a stripped gaseous stream and a stripped absorbent stream;
   (g) passing said stripped absorbent stream to said first absorption zone at a point between where said gaseous feed mixture enters said first absorption zone and where said lean absorbent solution enters said first absorption zone;
   (h) concurrently contacting said stripped gaseous stream from step (f) with a lean absorbent solution comprising the mixture of a tertiary amine, sulfolane and water in a third absorption zone under conditions which are selective for $H_2S$ removal, therein producing an unabsorbed gaseous stream and a third loaded absorbent solution; and
   (i) passing said third loaded absorbent solution to a regeneration zone, therein regenerating said third loaded absorbent and producing a lean absorbent solution.

2. The process according to claim 1 wherein said tertiary amine is an aliphatic amine containing at least one hydroxyalkyl group.

3. The process according to claim 2 wherein said tertiary amine is methyldiethanolamine.

4. The process according to claim 3 wherein said lean absorbent solution comprises 10 to 60%w methyldiethanolamine, 15 to 55%w sulfolane and 5 to 35%w water.

5. The process according to claim 1 wherein said first absorption zone comprises a contacting zone having 15–80 contacting trays.

6. The process according to claim 1 wherein the contacting temperature in step (a) is 20° to 80° C.

7. The process according to claim 1 wherein the pressure in step (a) is 20 to 100 bar.

8. The process according to claim 1 wherein the loaded absorbent solution is flashed to atmospheric pressure in step (b).

9. The process according to claim 8 wherein the flashing in step (b) is carried out at a temperature of from 60° to 90° C.

10. The process according to claim 1 wherein the temperature of the contacting in steps (c) and (h) is 15° to 50° C.

11. The process according to claim 1 wherein the loaded absorbent solution of steps (d), (e) and (i) are combined and regenerated together.

12. The process according to claim 1 wherein the regeneration is carried out by heating the loaded absorbent solution in a regeneration column with steam at a temperature of 80° to 160° C.

* * * * *